Figure 1:
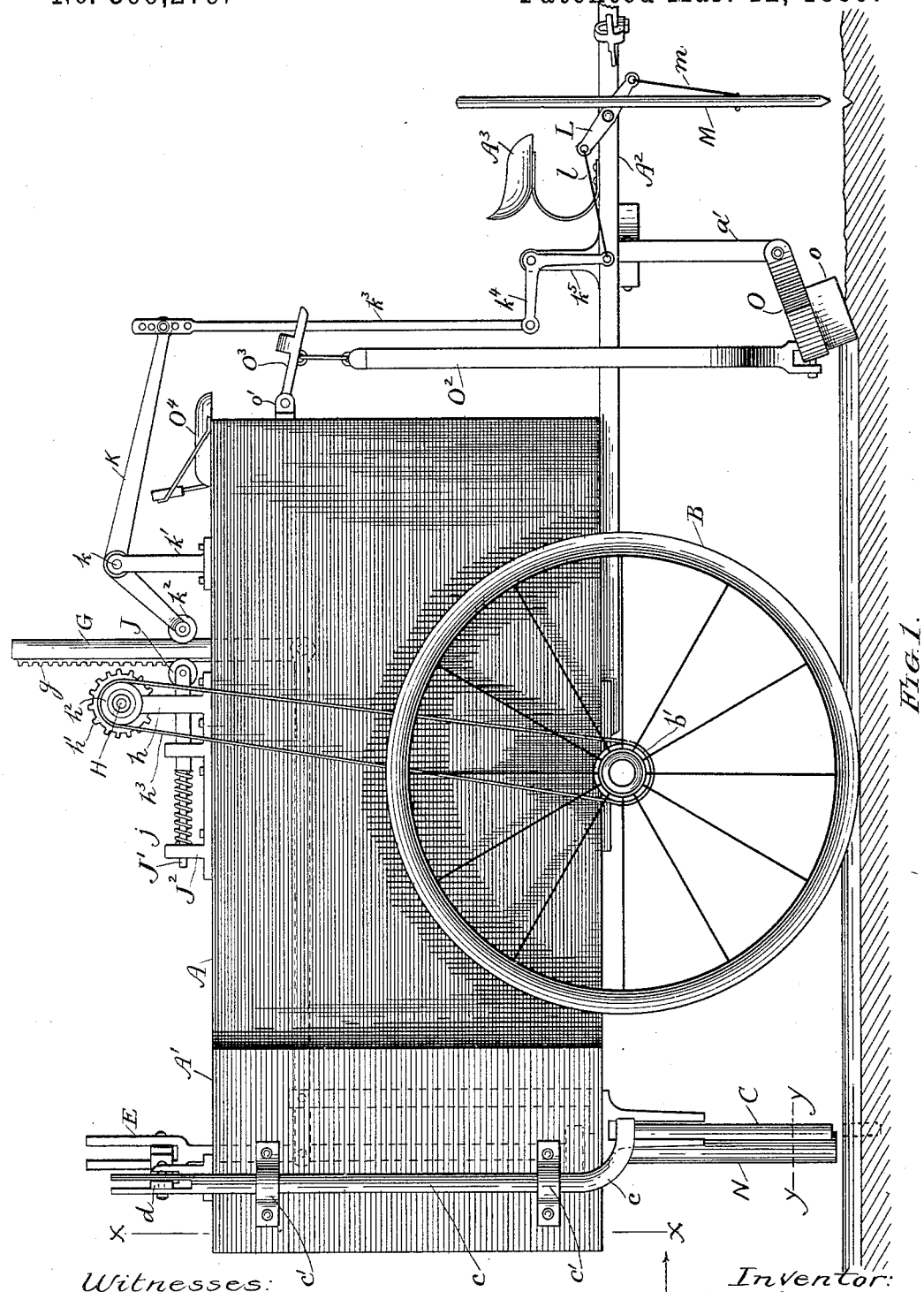

(No Model.) 2 Sheets—Sheet 1.

H. F. OLSEN.
MACHINE FOR IRRIGATING HILLS FOR PLANTS.

No. 399,279. Patented Mar. 12, 1889.

Witnesses:
J. B. Halpenny
David Stevens

Inventor:
Hans F. Olsen
By Gridley & Fletcher
his Atty.

(No Model.) 2 Sheets—Sheet 2.
H. F. OLSEN.
MACHINE FOR IRRIGATING HILLS FOR PLANTS.
No. 399,279. Patented Mar. 12, 1889.
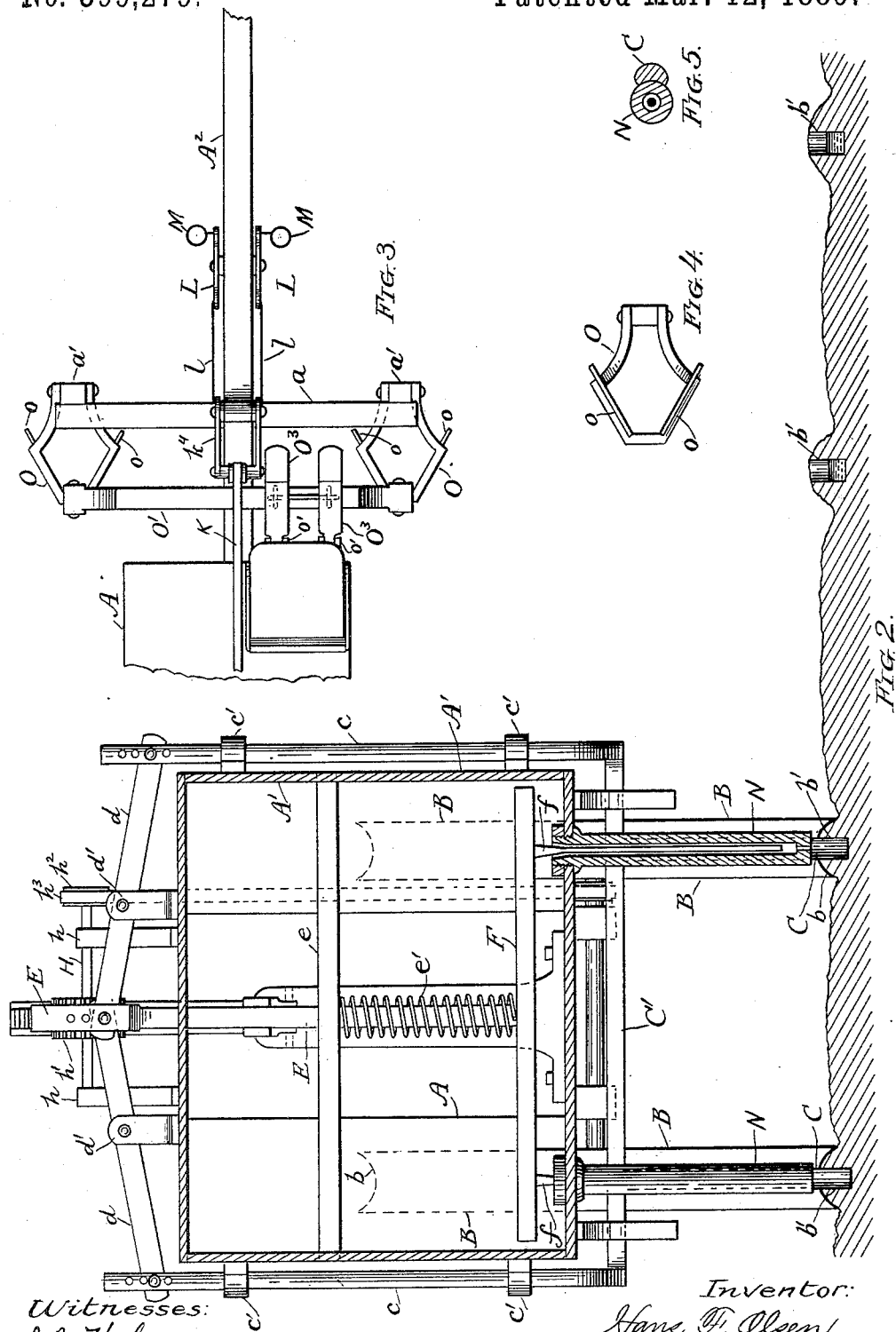

UNITED STATES PATENT OFFICE.

HANS F. OLSEN, OF STOUGHTON, WISCONSIN.

MACHINE FOR IRRIGATING HILLS FOR PLANTS.

SPECIFICATION forming part of Letters Patent No. 399,279, dated March 12, 1889.

Application filed September 21, 1888. Serial No. 285,992. (No model.)

*To all whom it may concern:*

Be it known that I, HANS F. OLSEN, of Stoughton, in the county of Dane and State of Wisconsin, have invented certain new and useful Improvements in Machines for Forming and Irrigating Hills for Tobacco-Plants, of which the following is a full, clear, and exact description, reference being had to the accompanying drawings, forming a part of this specification, in which—

Figure 1 is a side view of my improved machine. Fig. 2 is a sectional view of the same, taken upon the line $x$ $x$, Fig. 1, viewed in the direction of the arrow there shown. Fig. 3 is a plan view in detail of a portion of the front end of the machine. Fig. 4 is a like view in detail of one of the devices for forming the hills; and Fig. 5 is a sectional view upon the line $y$ $y$, Fig. 1.

Like letters of reference in the different figures indicate like parts.

The object of my invention is to provide a machine for forming and irrigating the hills for the reception of tobacco-plants; and it consists of the combination of elements hereinafter more particularly described, and definitely pointed out in the claims.

Referring to the drawings, A represents a closed tank for the reception of water, said tank being mounted upon wheels B B, the fellies of which are concave in cross-section, as shown at $b$, Fig. 2. The rear of said tank (shown at A') is wider than that which rests between the wheels, in order the more readily to permit the drills and irrigating-spouts to follow in the track of the wheels, as hereinafter stated.

Behind the wheels, respectively, I place drills C C, which are by preference attached to a cross-bar, C', Fig. 2, which is in turn attached to vertical guide-bars $c$ $c$, loosely secured in brackets $c'$ $c'$, attached to the exterior of the tank. The upper ends of the guide-bars $c$ $c$ are attached to the ends of levers $d$ $d$, which are pivoted to standards $d'$ $d'$ upon the top of the tank. The opposite ends of said levers respectively are loosely attached to a post, E, which is extended downwardly into the tank and through a rigid cross-bar, $e$, Fig. 2, arranged therein. A cross-bar, F, is attached to the lower end of the bar E, and between the bars F and $e$ is arranged a spiral spring, $e'$, for the purpose of exerting a downward pressure upon the inner ends of the levers $d$, so as to normally raise the lower ends of the drills C above the surface of the ground, as hereinafter specified.

Arranged within the tank is a horizontal bar, (indicated in dotted lines in Fig. 1,) which is pivotally attached to a rigid vertical standard, also indicated in dotted lines in said figure. One end of said horizontal bar is attached to the bar E and the other to a vertical bar, G, extending upwardly through the top of the tanks, said bar being provided with a rack, $g$, upon one side.

Mounted in bearings formed in standards $h$ $h$ attached to the top of the tank is a shaft, H, which carries a gear, $h'$, and pulley $h^2$. The latter is connected by means of a belt, $h^3$, to the hub $b'$ of the wheel B, which serves to continuously rotate said shaft. A friction-wheel, J, attached to a bar, J', arranged loosely in guides in a frame, $J^2$, is pressed against the bar G by means of a spring, $j$, which serves to normally hold the rack $g$ out of engagement with the gear $h'$. A bent lever, K, pivoted at $k$, to a rigid standard, $k'$, is provided with a friction-roller, $k^2$, upon one end, which bears against the bar G, while to the other end is loosely attached a link, $k^3$, which is in turn attached to one arm of an elbow-lever, $k^4$, pivoted to a standard, $k^5$, rigidly secured to the tongue $A^2$. The other arm of said lever is preferably attached by means of links $l$ $l$ to levers L L, pivoted to the tongue. A cord or chain, $m$, is then attached to the opposite arm of each of said levers L, and in turn to a stake, M, which is intended to be used by the operator who sits upon the seat $A^3$, in the manner and for the purposes hereinafter stated.

Extending downwardly from the tank at the rear of the machine and behind the drills C C are vertical spouts N N, which communicate with the tank A, and are provided with valves $f$ $f$, which serve to normally close the spouts N.

Rigidly attached to the tongue $A^2$ is a cross-bar, $a$, from the ends of which depend bars $a'$ $a'$, to the lower ends of which are loosely attached shoes O O, having flaring flanges $o$ $o$, which are close together at the rear end, so that when drawn over the ground they serve to scrape the soil into ridges directly in front of the wheels B B. Said shoes are connected with each other by means of a cross-bar, O', Fig. 3, to which is attached an upright link, $O^2$, Fig. 1, by means of which it is loosely connected with movable treadles $O^3$ $O^3$, the rear ends of which are hinged to lugs $o'$ $o'$ upon the tank in operative proximity to a seat, $O^4$, upon the top of the tank arranged for the driver.

My purpose, more specifically stated, is to form hills or ridges of earth at regular distances from each other, to make indentations therein for the reception of each plant, and to deposit a supply of water in each of said indentations so that workmen may follow thereafter and deposit the plants in each of said hills. These different operations of forming and irrigating the respective hills are accomplished as follows: Assuming the ground to be prepared and regularly marked in cross-rows, as is usually done for the planting of corn, the operator, sitting upon the seat $A^3$, grasps the stakes M M and thrusts one and then the other alternately into the ground at each cross-row that is passed, holding each stake successively in position until the machine is moved forward sufficiently to actuate one or the other of the levers L L. By this means the free end of the lever K is drawn down, the roller $k^2$ pressed against the bar G, which thrusts the rack $g$ into engagement with the normally-rotating gear $h'$, which tilts the lever within the tank, raises the bar E, depresses the drills C C through the levers $d$ $d$ and guide-bars $c$ $c$, unseats the valves $f$ $f$ in the spouts N, and permits the water from the tank to flow into each of the indentations caused by the depression of the drills C, as shown at $b'$ $b'$, Fig. 2. As soon as the stake M is withdrawn, the spring $j$ causes the rack $g$ to become disengaged from the gear $h'$, when the spring $e'$ serves to withdraw the drills C from the ground and to close the valves in the spouts N. With each thrust of a stake M this operation is repeated. The distance between the drill C and bar or stake M should be such as to correspond to that between one or more of the cross-rows or guide-marks, so that as the stake is thrust into said guide-mark the drill will of necessity be thrust into a corresponding guide-mark in the rear, so that it is obviously unnecessary for the operator to see the drills C in manipulating said stakes. As each cross-mark is passed, the operator upon the seat $O^4$ lifts the shoes O by means of the treadles $O^3$, thus leaving an accumulation of earth for the formation of a hill.

Having thus described my invention, I claim—

1. The combination, with the tank A, as specified, of the spouts N, valves $f$ $f$, bar F, spring $e'$, bar E, attached to laterally-extended levers connected with drills in operative connection with said spouts, a lever connected with a normally-disengaged rack and pinion, the latter being in operative connection with one of the wheels of the machine, stake M, and a series of levers in operative connection with said rack, whereby the latter may be thrown into engagement with said gear whenever the stake is thrust into the ground, substantially as shown and described.

2. The combination, with the treadles $O^3$, of the links $O^2$ and suspended shoes O, flaring outwardly in front and open at the rear, whereby the soil may be deposited in hills at each cross-mark, substantially as shown and described.

In testimony whereof I have signed this specification, in the presence of two subscribing witnesses, this 31st day of August, 1888.

HANS F. OLSEN.

Witnesses:
D. H. FLETCHER,
J. B. HALPENNY.